March 26, 1963  A. C. CULPEPPER ET AL  3,082,884
CONVEYOR-WEIGHER FOR COTTON BALES
Filed Nov. 16, 1959
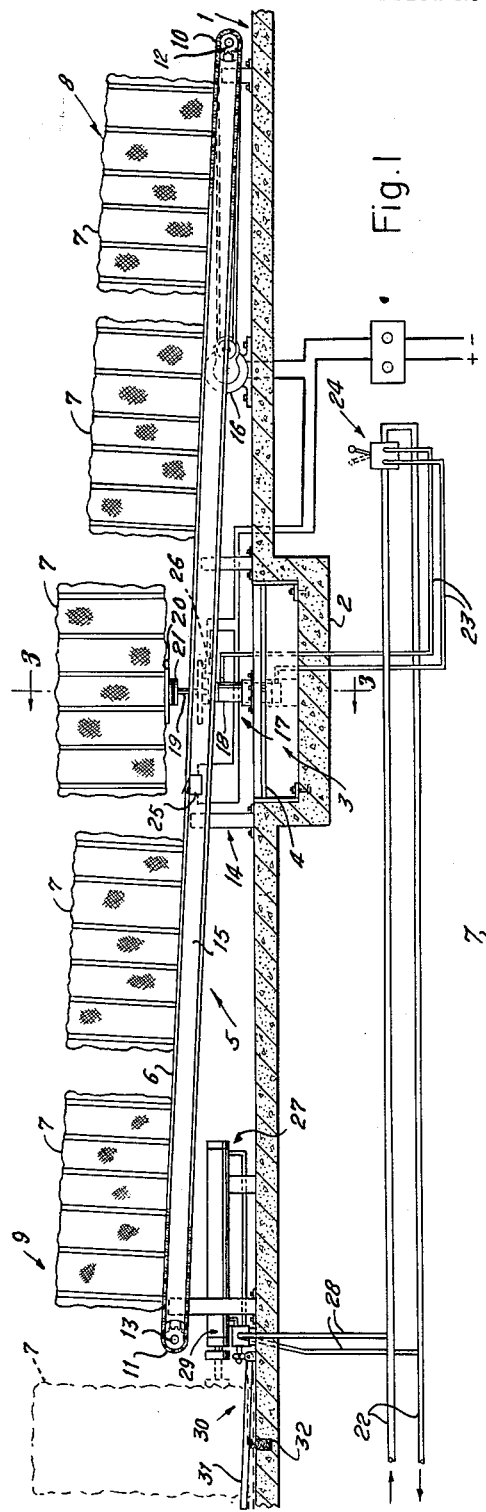
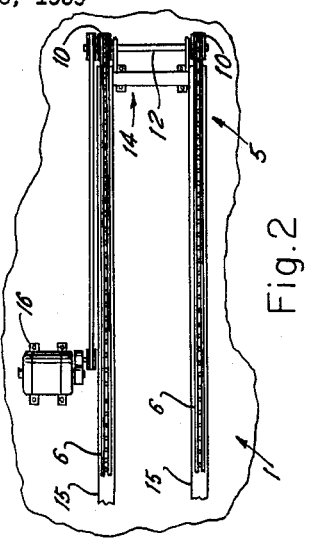
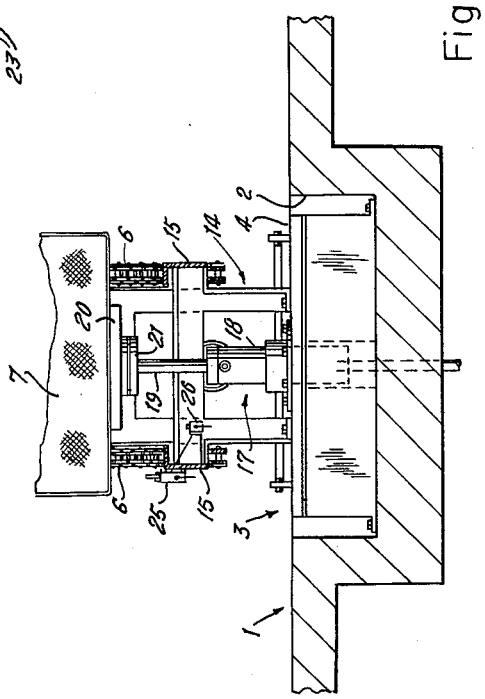
INVENTORS
A. C. Culpepper
J. D. Orr
Lonni Burk
BY
*Cecil L. Wood*
ATTORNEY United States Patent Office 3,082,884
Patented Mar. 26, 1963

3,082,884
CONVEYOR-WEIGHER FOR COTTON BALES
Arthur C. Culpepper, Box 265, James D. Orr, 811 E. Franklin, and Lonnie C. Burk, Rte. 2, all of Hillsboro, Tex.
Filed Nov. 16, 1959, Ser. No. 853,233
1 Claim. (Cl. 214—2)

This invention relates to apparatus for weighing and inspecting cotton bales.

An object of the invention is to provide, in combination with a belt conveyor including a pair of chain belts arranged in parallel, spaced apart relation to each other and adapted to move bales of cotton successively from a loading station to an unloading station, a weighing scale positioned intermediate the ends of the conveyor and having a platform disposed substantially below the chain belts, and a hydraulic lift including a vertically disposed cylinder mounted on the platform, a piston movable reciprocally in the cylinder, and a supporting element, smaller than the platform and normally disposed between the chain belts, below their upper surfaces, mounted on the upper end of the piston and engageable with the under side of a bale supported on the conveyor, whereby the bale is adapted to be supported on the scale upon raising the supporting element above the chain belts.

Another object of the invention is to provide a structure as described in which the supporting element is rotatably mounted on the upper end of the piston, so that a bale supported on the supporting element, in its uppermost position, is adapted to be turned therewith, to facilitate inspection of the bale, simultaneously with the weighing of the bale.

Another object of the invention is to provide, in the structure described, an electric motor arranged to drive the conveyor, and an electrical circuit including the motor, a first switch positioned above the scale, in the path of a cotton bale traveling along the conveyor, adapted to be actuated, by successive impacts of the bale therewith, to open and close the motor circuit, and adapted to open the circuit, to stop the motor, upon advancing the bale along the conveyor to a position above the scale, and a second switch positioned below the supporting element adapted to be actuated, by impact of the supporting element therewith, to open and close the motor circuit upon raising and lowering the supporting element, and adapted to open the circuit, to stop the motor, upon raising the supporting element above its lowermost position, the first and second switches being adapted to close the circuit, upon impact of the bale and the supporting element, respectively, therewith, upon returning the supporting element to its lowermost position.

Another object of the invention is to provide, in the structure described, a forwardly and upwardly inclined conveyor having its delivery end raised above the supporting surface whereby a bale traveling along the conveyor, and resting on its side, its adapted to be turned on end upon being discharged from the conveyor onto the supporting surface, and a hydraulic ram disposed horizontally below the delivery end of the conveyor, substantially in alignment therewith, engageable with a bale discharged from the conveyor whereby the bale is adapted to be displaced horizontally, away from the conveyor, a distance sufficient to make room for another bale adjacent the delivery end of the conveyor.

Another object of the invention is to provide, in the structure described, valve means controlling the supply of hydraulic fluid to the hydraulic ram, a crank lever acting on the valve means whereby the hydraulic ram is operable in response to movement of the crank lever about its pivot, one of the arms of the crank lever consisting of a planar element overlying the supporting surface, in the path of a cotton bale as it is discharged from the conveyor, and spring means acting on the supporting surface and the planar element whereby the planar element is normally biased upwardly, above the supporting surface, the arrangement being such that the planar element is adapted to be depressed, whereby the crank lever is rotated about its pivot, to thereby actuate the hydraulic ram, in response to the weight of a bale deposited on the planar element.

The invention will be readily understood by referring to the following description and the accompanying drawing, in which:

FIGURE 1 is a side elevational view of apparatus embodying the invention;
FIGURE 2 is a fragmentary top plan view; and
FIGURE 3 is a sectional elevational view taken on the line 3—3 of FIGURE 1.

Referring to the drawing, the numeral 1 designates a supporting surface, which as shown consists of a concrete floor having a pit 2 therein. A weighing scale, which is indicated generally by the numeral 3, is disposed within the pit 2. The scale 3 has a platform 4 which normally is positioned substantially level with the floor 1.

A belt conveyor, which is indicated generally by the numeral 5, includes a pair of chain belts 6 which are arranged in parallel, spaced apart relation to each other, and are adapted to move bales of cotton, indicated by the numerals 7, successively from a loading station 8 to an unloading station 9.

The conveyor 5 extends across the top of the scale 3, which is positioned intermediate its ends, and is inclined forwardly and upwardly toward its delivery end. The chain belts 6 are carried by two pairs of sprockets 10 and 11, which are mounted on rotatable shafts 12 and 13 arranged transversely of a supporting frame 14, adjacent opposite ends thereof, and are additionally supported intermediate the ends of the frame 14 by a pair of side rails 15. The shaft 12 is driven by an electric motor 16.

The platform 4 of the scale 3 is disposed substantially below the chain belts 6. A hydraulic lift 17 has a vertically disposed cylinder 18 mounted on the platform 4, a piston 19 movable reciprocally in the cylinder 18, and a supporting element 20, smaller than the platform 4 and normally disposed between the chain belts 6, below their upper surfaces, mounted on the upper end of the piston 19 and engageable with the under side of a bale 7 supported on the conveyor 5, whereby the bale 7 is adapted to be supported on the scale 3 upon raising the supporting element 20 above the chain belts 6.

A bearing 21 is disposed between the supporting element 20 and the upper end of the piston 19, whereby the supporting element 20 is rotatably mounted on the upper end of the piston 19, so that a bale 7 supported on the supporting element 20, in its uppermost position, is adapted to be turned therewith, to facilitate inspection of the bale 7, simultaneously with the weighing of the bale 7.

Hydraulic fluid is supplied to the hydraulic lift 17, and exhausted therefrom, whereby the piston 19 thereof is raised and lowered, by fluid conduits 22 and branch pipes 23. Operation of the hydraulic lift 17 is controlled by manually operable valve means, indicated generally by the numeral 24, operatively connected between the fluid conduits 22 and the branch pipes 23.

The motor 16 is connected in an electrical circuit which includes also a first switch 25 and a second switch 26. The first switch 25 is positioned above the scale 3, in the path of a cotton bale 7 traveling along the conveyor 5, and is adapted to be actuated, by successive impacts of the bale 7 therewith, to open and close the motor circuit. The first switch 25 is adapted to open the circuit, to stop the motor 16, upon advancing the bale 7 along the conveyor 5 to a position above the scale 3.

The second switch 26 is positioned below the supporting element 20, and is adapted to be actuated, by impact of the supporting element 20 therewith, to open and close the motor circuit upon raising and lowering the supporting element 20. The second switch 26 is adapted to open the circuit, to stop the motor 16, upon raising the supporting element 20 above its lowermost position.

The first and second switches 25 and 26 are adapted to close the circuit, upon impact of the bale 7 and the supporting element 20, respectively, therewith, upon returning the supporting element 20 to its lowermost position.

The conveyor 5 has its delivery end raised above the floor 1 whereby a bale 7 traveling along the conveyor 5, and resting on its side, is adapted to be turned on end upon being discharged from the conveyor 5 onto the floor 1.

A hydraulic ram 27 is disposed horizontally below the delivery end of the conveyor 5, substantially in alignment therewith. The hydraulic ram 27 is engageable with a bale 7 discharged from the conveyor 5 whereby the bale 7 is adapted to be displaced horizontally, away from the conveyor 5, a distance sufficient to make room for another bale 7 adjacent the delivery end of the conveyor 5.

Hydraulic fluid is supplied to the hydraulic ram 27, and exhausted therefrom, whereby the piston thereof is advanced and retracted, by the fluid conduits 22 and branch pipes 28. Operation of the hydraulic ram 27 is controlled by valve means, indicated generally by the numeral 29, operatively connected between the branch pipes 28.

A crank lever, indicated generally by the numeral 30, acts on the valve means 29 whereby the hydraulic ram 27 is operable in response to movement of the crank lever 30 about its pivot. One of the arms of the crank lever 30 consists of a planar element 31, which overlies the floor 1, and is positioned in the path of a cotton bale 7 as it is discharged from the conveyor 5.

A compression spring 32, which is received in a recess therefor in the floor 1, acts on the floor 1 and the planar element 31 whereby the planar element 31 is normally biased upwardly, above the floor 1. The arrangement is such that the planar element 31 is adapted to be depressed, whereby the crank lever 30 is rotated about its pivot, to thereby actuate the hydraulic ram 27, in response to the weight of a bale 7 deposited on the planar element 31.

The invention may be modified in various ways without departing from the spirit and scope thereof.

What is claimed is:

In combination with a belt conveyor including a pair of chain belts arranged in parallel, spaced apart relation to each other and adapted to move bales of cotton successively from a loading station to an unloading station, the conveyor being inclined forwardly and upwardly and having its delivery end raised above the supporting surface whereby a bale traveling along the conveyor, and resting on its side, is adapted to be turned on end upon being discharged from the conveyor onto the supporting surface, a weighing scale positioned intermediate the ends of the conveyor and having a platform disposed substantially therebelow, a hydraulic lift mounted on the platform, a supporting element rotatably mounted on the upper end of the lift between the said chain belts and engageable with the under side of a bale supported on the conveyor to raise the bale and rotatably suport the same above the chain belts whereby said bale is adapted to be turned therewith to facilitate inspection of the bale simultaneously with the weighing of the bale, an electric motor arranged to drive the conveyor and an electric circuit therefor, a first switch positioned above the scale, in the path of a bale traveling along the conveyor, adapted to be actuated, by successive impacts of the bale therewith, to open and close the motor circuit, upon advancing the bale along the conveyor to a position above the scale, and a second switch positioned below the supporting element adapted to be actuated, by impact of the supporting element therewith, to open and close the motor circuit upon raising and lowering the supporting element, a spring biased planar element arranged at and below the level of the delivery end of said conveyor adapted to receive a cotton bale from said conveyor, a hydraulic ram disposed horizontally below and parallel to the delivery end of the conveyor engageable with a bale discharged from the conveyor whereby the bale is adapted to be displaced horizontally from said planar element and away from the conveyor to make room for another bale adjacent the delivery end of the conveyor, valve means for controlling the supply of hydraulic fluid to the hydraulic ram and a crank lever operatively connected to said planar element and acting on the valve means whereby the hydraulic ram is operable in response to the weight of a cotton bale on said planar element.

References Cited in the file of this patent

UNITED STATES PATENTS

| | | |
|---|---|---|
| 1,129,432 | Stockton | Feb. 23, 1915 |
| 2,766,001 | Kindseth | Oct. 9, 1956 |
| 2,857,040 | Campbell | Oct. 21, 1958 |
| 2,905,310 | Stoeckel | Sept. 22, 1959 |
| 2,920,741 | Rysti | Jan. 12, 1960 |